United States Patent [19]
Spittka et al.

[11] Patent Number: 6,143,841
[45] Date of Patent: Nov. 7, 2000

[54] COATINGS BASED ON THERMOPLASTIC POLYESTERS WITH ADDITION OF AN UNSATURATED POLYESTER AS ADDITIVE RESIN

[75] Inventors: Rainer Spittka, Voerde; Hans-Dieter Zagefka, Haltern; Dirk Hoppe, Nottuln, all of Germany

[73] Assignee: Huels Aktiengesellschaft, Marl, Germany

[21] Appl. No.: 09/245,847

[22] Filed: Feb. 8, 1999

[30] Foreign Application Priority Data

Feb. 7, 1998 [DE] Germany ............ 198 05 008

[51] Int. Cl.⁷ ................... C08L 67/00
[52] U.S. Cl. ............ 525/444; 525/445; 525/447; 524/539
[58] Field of Search ................ 525/444, 445, 525/42, 447

[56] References Cited

U.S. PATENT DOCUMENTS 4,054,681  10/1977  Bruning ............ 427/27
4,318,837   3/1982  Streets ............ 524/364

*Primary Examiner*—Patricia A. Short
*Attorney, Agent, or Firm*—Oblon, Spivak, McClelland, Maier & Neustadt, P.C.

[57] ABSTRACT

A coating formulation comprises (A) a base polyester consisting of the copolymerization product of at least one aliphatic, cycloaliphatic and/or aromatic polybasic acid and/or anhydride thereof or at least one hydroxycarboxylic acid or derivative thereof and at least one diol, and (B) an additive polyester resin prepared by condensing at least one unsaturated dicarboxylic acid and optionally at least one saturated dicarboxylic acid monomer with at least one diol and/or triol, wherein the proportion of unsaturated additive polyester to base polyester ranges from 0.1–15 parts to 99.9–85 parts.

16 Claims, No Drawings

COATINGS BASED ON THERMOPLASTIC POLYESTERS WITH ADDITION OF AN UNSATURATED POLYESTER AS ADDITIVE RESIN

BACKGROUND OF THE INVENTION

Field of the Invention

The present invention relates to an epoxy resin-free coating system based on thermoplastic polyesters, into which a special additive resin is incorporated as a promoting component.

For a long time now, coating materials based on thermoplastic polyesters have been produced and marketed for a very wide variety of applications. The common method of production is to incorporate the adjuvants required for the intended application, such as color pigments, fillers, stabilizers, leveling agents, luster agents and/or other additional and auxiliary substances, into the polyester in compounding extruders or kneading apparatus. The compounded formulation (compound) can then be applied as a solution, film, melt, powder or in some other form in the sphere of use envisaged.

A technique which has proven particularly suitable in practice is the powder coating of metals by the fluidized-bed sintering or electrostatic method. In the fluidized-bed sintering method, hot metal parts are coated by dipping them into an air-fluidized bed of the pulverulent coating material. In the course of this procedure the thermoplastic melts onto the surface and, after cooling, forms a protective coating. In electrostatic coating, powder is sprayed by means of compressed air onto the metal part, where it remains adhered through the application of a high direct current voltage. Subsequently, a coating is obtained likewise by melting the applied thermoplastic in an oven or by use of a gas flame, for example. The coating material can also be employed in another way—as a melt or film, for example.

Despite the fact that the preparation of thermoplastic coating powders is relatively complex, because of the cold grinding operation necessary with liquid nitrogen, it has been possible to maintain and even increase the market share of these materials in the face of competition from wet coating materials and reactive systems. Environmental factors are critical here, since coating powders operate entirely without solvent. In addition, purely thermoplastic coating materials have processing advantages over reactive systems, since they are melted on a surface purely by the application of heat and cured by cooling. Because of this they are suitable, inter alia, for extremely rapid coating units operating with downstream further processing, for which reactive systems are generally too slow. By their very nature, reactive systems require chemically reactive components and hardeners, which are often toxicologically objectionable. Moreover, a proportion of residual monomer remains in the coating after the reaction.

These are also the reasons why the use of thermoplastic systems is preferred in connection with the weld-seam protection of welded preserve cans. In the can, the can seam is reliably protected by thermoplastic polyesters against any ingredient, and hence preserves the contents unchanged.

The necessary coating properties, such as adhesion, elasticity and coating sterilizability, are not provided by the thermoplastic polyester alone. Marked improvements have only been obtained, rather, by the admixing the polyester with the appropriate additives. Through the effect of corresponding formulations the properties have been optimized to the extent where, today, coatings of thermoplastic polyesters have attained very good service properties.

The state of the art technique of promoting adhesion is to incorporate epoxy resin additives into the thermoplastic polyesters. In this instance the epoxy resin is not, as is usually the case, chemically crosslinked, but is merely mixed with the polyester, since the polyesters commonly employed do not possess any notable reactive groups. The activity of the epoxy resin additive in terms of the coating properties is excellent and, therefore, makes it possible to comply fully with all requirements placed on the coating system.

Where the coating system is employed in the food packaging sector, the relevant regulations must be met, such as FDA 175.300 (USA), Directive 90/128(EU), and the like. It is here, in particular, that thermoplastic systems, as already stated, have decisive advantages over other systems.

In the recent past epoxy resins employed as coating material in the food packaging sector have come under close public scrutiny. Traces of Bisphenol A diglycidyl ether (BADGE) from epoxy resin coating materials leach out of the interior coatings of preserve cans and are absorbed into the human organism together with the food. In oil-containing fish cans, indeed, inadmissibly high concentrations of BADGE, which leach from the interior coating, have been measured. BADGE is now suspected on intake into the human organism of having brought about carcinogenic and estrogenic effects. A consequence of this is that the Scientific Committee on Foods (SCF) of the European Union (KU) in June 1996 undertook a toxicological reassessment of BADGE. Accordingly, although there is as yet no firm evidence of a carcinogenic effect, the German Federal Institute for Consumer Health Protection and Veterinary Medicine (BgVV) called, in a press release in November 1996, for technological measures to minimize the contamination of foods. BADGE contents of more than 1 mg/kg are classified accordingly as objectionable on health grounds.

Customary thermoplastic coating systems include in their formulation a small percentage of epoxy resin, which of course likewise includes a certain amount of residual monomer (BADGE). As a consequence, the thermoplastic polyester coating system, which in principle is ecologically and toxicologically flawless, has still come in for criticism because of the epoxy resin additive.

SUMMARY OF THE INVENTION

Accordingly, one object of the present invention is to provide an additive for a coating system, which is entirely unobjectionable toxicologically and which ensures properties of the coating which are at least as good as those of the epoxy resin additive.

Briefly, this object and other objects of the present invention as hereinafter will become more readily apparent can be attained by a coating formulation, which comprises:

A) a base polyester consisting of the copolymerization product of at least one aliphatic, cycloaliphatic and/or aromatic polybasic acid and/or anhydride thereof or at least one hydroxycarboxylic acid or derivative thereof and at least one diol;

B) an additive polyester resin prepared by condensing at least one unsaturated dicarboxylic acid and optionally at least one saturated dicarboxylic acid monomer with at least one diol and/or triol, wherein the proportion of unsaturated additive polyester to base polyester ranges from 0.1–15 parts additive polyester to 99.9–85 parts base polyester; and C) at least one adjuvant selected from the group consisting of color pigments, fillers, leveling agents and other customary auxiliary substances.

DETAILED DESCRIPTION OF THE PREFERRED EMBODIMENTS

It has surprisingly been found that the addition of specific unsaturated polyester resins to known base copolyesters can improve the profile of properties of the coatings produced by melt application, relative to the pure copolyesters, to such an extent that they withstand the sterilization test and are also suitable for food packaging.

Suitable unsaturated additive polyesters of the invention are normally dissolved in a copolymerizable monomer, usually styrene, or in a reactive diluent (UP resins) and then cured by subjecting them to free-radical polymerization. Principal areas of application of UP resins are in the construction industry as nonreinforced or glass fiber-reinforced products, the automotive sector as refinish fillers or, for example, the industrial coating of wood and furniture.

The additive resins are prepared by polycondensation of diols and dicarboxylic acids. Suitable unsaturated dicarboxylic acids for the formation of the unsaturated polyester resins of the invention preferably are maleic acid (as the anhydride) or fumaric acid. It is also possible, however, to employ mesaconic, citraconic, itaconic and/or tetrahydrophthalic acid. In addition to the unsaturated acids, however, the properties of the unsaturated polyester resin are controlled further by using phthalic, isophthalic, terephthalic, adipic, succinic or sebacic acid.

Suitable diols which are useful in the preparation of the unsaturated polyester include ethylene glycol, 1,2- or 1,3-propanediol, diethylene, dipropylene, triethylene and tetraethylene glycol, 1,2- and 1,4-butanediol and, in particular, Dicidol [for preparation and properties of unsaturated polyester resins see also H. Krämer, Ullmann's Encyclopedia of Industrial Chemistry Vol. A 21, p.217 ff. (1992)].

The additive polyester resin is preferably prepared by condensing di- and/or triols with one or more dicarboxylic acids, where one or two acid monomers are unsaturated. The unsaturated polyesters of the invention have the following properties:

| | |
|---|---|
| Melting point | from 50–120° C. |
| Acid number | from 8–50 mg KOH/g |
| Hydroxyl number | from 10–60 mg KOH/g |

The unsaturated polyester is employed in amounts of from 0.1–15 parts relative to 99.9–85 parts of base polyester, preferably from 0.5–10 parts relative to 99.5–90 parts of base polyester and, with particular preference, from 1–5 parts relative to 99–95 parts of base polyester.

In order to prepare the coating composition, the additive resin can be processed in an extruder with the copolyester and the other known additive substances customary in practice such as color pigments, fillers, stabilizers, leveling agents, luster agents and/or other additional and auxiliary substances to give a product composition.

Alternatively, the additive polyester resin can be added to the liquid copolyester melt at the end of the condensation of the copolyester, and can be homogenized in this melt and discharged as a homogeneous mixture using techniques customary and known in the art. In this case it should be ensured that:

1) the polyester melt is cooled before the additive resin is added, and 2) the residence time of the polymer mixture in the reactor is as short as possible, in order to avoid an unwanted reduction in molecular weight, or transesterification, of the polyester.

The thermoplastic base polyester used in the coating materials of the invention is a partially crystalline polyester having a viscosity number >60 ml/g, preferably >70 ml/g, a glass transition temperature ranging from 0–50° C., preferably ranging from 10–40° C., and a melting range of 150–200° C., preferably from 160–180° C.

The base polyester has as its acid component at least one aromatic dicarboxylic acid such as terephthalic acid, and at least one aliphatic dicarboxylic acid of 2–36 carbon atoms or ester-forming derivatives thereof. On the diol side the polyester preferably contains 1,4-butanediol and, optionally, one or more aliphatic diols having 2–36 carbon atoms.

The coating system of the invention may include, as an additional component, a third type of polyester. This polyester is partially crystalline and contains as its acid component at least one aromatic dicarboxylic acid such as terephthalic acid, for example, and at least one aliphatic dicarboxylic acid of 2–36 carbon atoms, or ester-forming derivatives thereof. As for the diol component, the polyester contains 1,4-butanediol and optionally one or more aliphatic diols having 2–36 carbon atoms. The polyester is employed in amounts of from 2–60% by weight, preferably from 5–50% by weight and, with particular preference, from 10–40% by weight, based on the overall compound. It has a viscosity number >60 ml/g, preferably >70 ml/g, a glass transition temperature ranging from −50 to 0° C., preferably from −40 to −10° C., and a melting range of 140–200° C., preferably from 145–170° C. This polyester gives the compound flexible properties and makes it particularly suitable for the coating of parts which subsequently undergo mechanical deformation.

The coating materials of the invention can be employed for a very wide variety of applications. One particular field of use is coating in the sector of food packaging. For this purpose the adjuvants required for the intended application, such as color pigments, fillers, stabilizers, leveling agents, luster agents and/or other additional and auxiliary substances, are incorporated into the polyester. The compound can then be applied as a solution, film, melt, powder or in another form in the intended field of use.

Having now generally described the invention, a further understanding can be obtained by reference to certain specific examples which are provided herein for purpose of illustration only and are not intended to be limiting unless otherwise specified.

COMPARATIVE EXAMPLE 1

(Thermoplastic polyester without additive)

A thermoplastic polyester, prepared as described in DP 23 46 559, is processed with the addition of 20% of titanium oxide and 0.5% of a leveling agent to give a compound. This compound is subsequently cold-ground and sieved to give a powder <85 μm. The powder is applied to metal panels about 0.4 mm thick by spraying with an electrostatic gun and is melted in an oven at 200° C. for 5 minutes.

The coating, which is approximately 60 μm thick, has the following properties:

Adhesion: crosshatch GT 0,

Elasticity: Erichsen indentation >10 mm,

Adhesion after hot water test: crosshatch GT 0,

Adhesion after acetic acid sterilization (3%): crosshatch GT 4,

Adhesion after lactic acid sterilization (2%): crosshatch GT 4.

Final assessment: The coating system loses its adhesion after acid attack and is of only limited use in practice.

COMPARATIVE EXAMPLE 2

(Thermoplastic polyester with epoxy resin additive)

A coating powder was prepared as described in Comparative Example 1, but with the addition of 5% of epoxy resin additive. As in Example 1, the powder was applied to metal panels about 0.4 mm thick by spraying with an electrostatic gun and melted in an oven at 200° C. for 5 minutes.

The coating, which is approximately 60 μm thick, has the following properties:

Adhesion: crosshatch GT 0,

Elasticity: Erichsen indentation >10 mm,

Adhesion after hot water test: crosshatch GT 0,

Adhesion after acetic acid sterilization (3%): crosshatch GT 0,

Adhesion after lactic acid sterilization (2%): crosshatch GT 0.

EXAMPLES

The Examples employ a thermoplastic polyester as described in DB 23 46 559).

The additive resin 1 employed is a customary commercial polyester resin (Hüls AG, Haftharz LTH) having the following characteristics.

| | |
|---|---|
| Melting point (DIN 53 181) | 90–102° C. |
| Acid number (DIN 53 402/ISO 2114) | from 12–20 mg KOH/g |
| Hydroxyl number (DIN/ISO 4629) | about 25 mg KOH/g |

Additive resin 2 is prepared by condensing fumaric acid, isophthalic acid (1:1) and 1,2-propanediol to give a polyester having the following characteristics:

| | |
|---|---|
| Melting point (DIN 53 181) | 78° C. |
| Acid number (DIN 53 402/ISO 2114) | 29 mg KOH/g |
| Hydroxyl number (DIN/ISO 4629) | 31 mg KOH/g |

The additive resins 1 and 2 are used to prepare coating compositions (Tab. 1)

TABLE 1

COATING COMPOSITIONS

| | Constituent in % by weight | |
|---|---|---|
| | Formulation 1 | Formulation 2 |
| Copolyester 1 | 73 | 73 |
| Additive resin 1 | 3 | 0 |
| Additive resin 2 | 0 | 3 |
| TiO₂ RTG-30 | 20 | 20 |
| Micro Mica W1 | 3.5 | 3.5 |
| Perenol F30 mod | 0.50 | 0.50 |
| Total | 100 | 100 |

The respective coating compositions were used to produce coatings from the melt. The results of performance testing are summarized in Table 2:

TABLE 2

TESTING THE COATINGS

| Property | Formulation 1 | Formulation 2 |
|---|---|---|
| Adhesion | GT0 | GT0 |
| Elasticity, Erichsen test | >10 mm | >10 mm |
| Adhesion after: | | |
| Acetic acid sterilization (3%) | GT0 | GT0 |
| Lactic acid sterilization (2%) | GT0 | GT0 |

Final assessment: The coating systems become resistant to sterilization through the addition of the unsaturated polyester resins; the adhesion is very good even after acid attack, and the system can be employed for all fields of use.

From Comparative Example 1 it is clear that even a formulation-optimized thermoplastic polyester is unable to meet all the requirements placed on a coating system.

Comparative Example 2 shows the system which is currently employed industrially; however, this formulation includes BADGE.

The Examples show the use of the adhesion-promoting polyesters of the invention. They offer a fully equivalent replacement for epoxy resin, with equally good service properties.

Obviously, numerous modifications and variations of the present invention are possible in light of the above teachings. It is, therefore, to be understood that within the scope of the appended claims, the invention may be practiced otherwise than as specifically described herein.

The disclosure of German priority Application Number 19805008.9 filed Feb. 7, 1998 is hereby incorporated by reference into the present application.

What is claimed as new and is intended to be secured by letters patent is:

1. A coating formulation consisting of:
   A) a thermoplastic base polyester consisting of the copolymerization product of at least one aliphatic, cycloaliphatic and/or aromatic polybasic acid and/or anhydride thereof or at least one hydroxycarboxylic acid or derivative thereof and at least one diol;
   B) an unsaturated additive polyester resin prepared by condensing at least one unsaturated dicarboxylic acid and optionally at least one saturated dicarboxylic acid monomer with at least one diol and/or triol, wherein the proportion of unsaturated additive polyester to base polyester ranges from 0.1–15 parts to 99.9–85 parts; and
   C) at least one substance selected from the group consisting of color pigments, fillers, stabilizers, leveling agents and luster agents.

2. The coating formulation as claimed in claim 1, wherein said proportion ranges from 0.5–10 parts of additive polyester to 99.5–90 parts of base copolyester.

3. The coating system as claimed in claim 1, wherein said proportion ranges from 1–5 parts of additive polyester to 99–95 parts of base copolyester.

4. The coating formulation as claimed in claim 1, wherein said diol used to prepare the unsaturated additive polyester is 3 (4), 8 (9) bis-(hydroxymethyl) tricyclo-(5,2,10,2,6) decane.

5. The coating formulation as claimed in claim 1, wherein the unsaturated dicarboxylic acid monomer is maleic, fumaric, mesaconic, citraconic, itaconic and/or tetrahydrophthalic acid.

6. The coating formulation as claimed in claim 5, wherein the unsaturated dicarboxylic acid monomer is fumaric acid.

7. The coating formulation as claimed in claim 1, wherein the base polyester has a glass transition temperature ranging from 0–50° C., and a melting range of 150–200° C.

8. The coating formulation as claimed in claim 6, wherein the base polyester has a glass transition temperature ranging from 10–40° C., and a melting range of 160–180° C.

9. The coating formulation as claimed in claim 1, wherein the base polyester consists of
   A) at least one aromatic polybasic dicarboxylic acid and at least one aliphatic dicarboxylic acid of 2–36 carbon atoms or the ester-forming derivatives thereof, and
   B) 1,4-butanediol or 1,4-butanediol with at least one aliphatic diol having 2–36 carbon atoms.

10. A process for preparing the coating formulation as claimed in claim 1, which comprises:
    processing the base copolyester (A) and additive polyester resin (B) in an extruder with adjuvants to prepare the coating formulation.

11. A process for preparing a coating formulation as claimed in claim 1, which comprises:
    after preparing the base copolyester, adding the additive polyester resin in the required proportion to the copolyester melt in liquid form;
    homogenizing the combined polyesters in the melt; and
    discharging the two blended components from the device in which they are homogenized.

12. A method of preparing a food packaging container, comprising:
    coating the surfaces of the container with the coating formulation of claim 1.

13. A method of making a coating formulation, the method comprising
    adding together A) a thermoplastic base polyester, B) an unsaturated additive polyester resin, and C) at least one substance selected from the group consisting of color pigments, fillers, stabilizers, leveling agents and luster agents; and
    forming the coating formulation of claim 1.

14. A coating formulation comprising:
    A) a thermoplastic base polyester consisting of the copolymerization product of at least one aliphatic, cycloaliphatic and/or aromatic polybasic acid and/or anhydride thereof or at least one hydroxycarboxylic acid or derivative thereof and at least one diol;
    B) an unsaturated additive polyester resin prepared by condensing at least one unsaturated dicarboxylic acid and optionally at least one saturated dicarboxylic acid monomer with at least one diol and/or triol, wherein the proportion of unsaturated additive polyester to base polyester ranges from 0.1–15 parts to 99.9–85 parts;
    C) at least one substance selected from the group consisting of color pigments, fillers, stabilizers, leveling agents and luster agents; and
    D) a third polyester formed by reacting:
       a) at least one aromatic dicarboxylic acid and at least one aliphatic dicarboxylic acid of 2–36 atoms, or ester-forming derivatives thereof, and
       b) 1,4-butanediol, or 1,4-butanediol with at least one aliphatic diol having 2–36 carbon atoms, wherein
          the third polyester has a glass transition temperature ranging from −50 to 0° C. and a melting range of 140–200° C., and
          the third polyester is incorporated in the coating formulation in an amount of from 2–60% by weight, based on the overall coating formulation.

15. The coating formulation as claimed in claim 14, wherein
    the third polyester has a glass transition temperature ranging from −40 to −10° C. and a melting range of 145–170° C., and
    the third polyester is incorporated in the coating formulation in an amount of from 5–50% by weight, based on the overall coating formulation.

16. A method of making a coating formulation, the method comprising
    adding together A) a thermoplastic base polyester, B) an unsaturated additive polyester resin, C) at least one substance selected from the group consisting of color pigments, fillers, stabilizers, leveling agents and luster agents, and D) a third polyester; and
    forming the coating formulation of claim 14.

* * * * *